July 23, 1929.  B. P. JOYCE  1,721,737
PRESSURE FLUID PACKING
Filed July 29, 1927  2 Sheets-Sheet 1
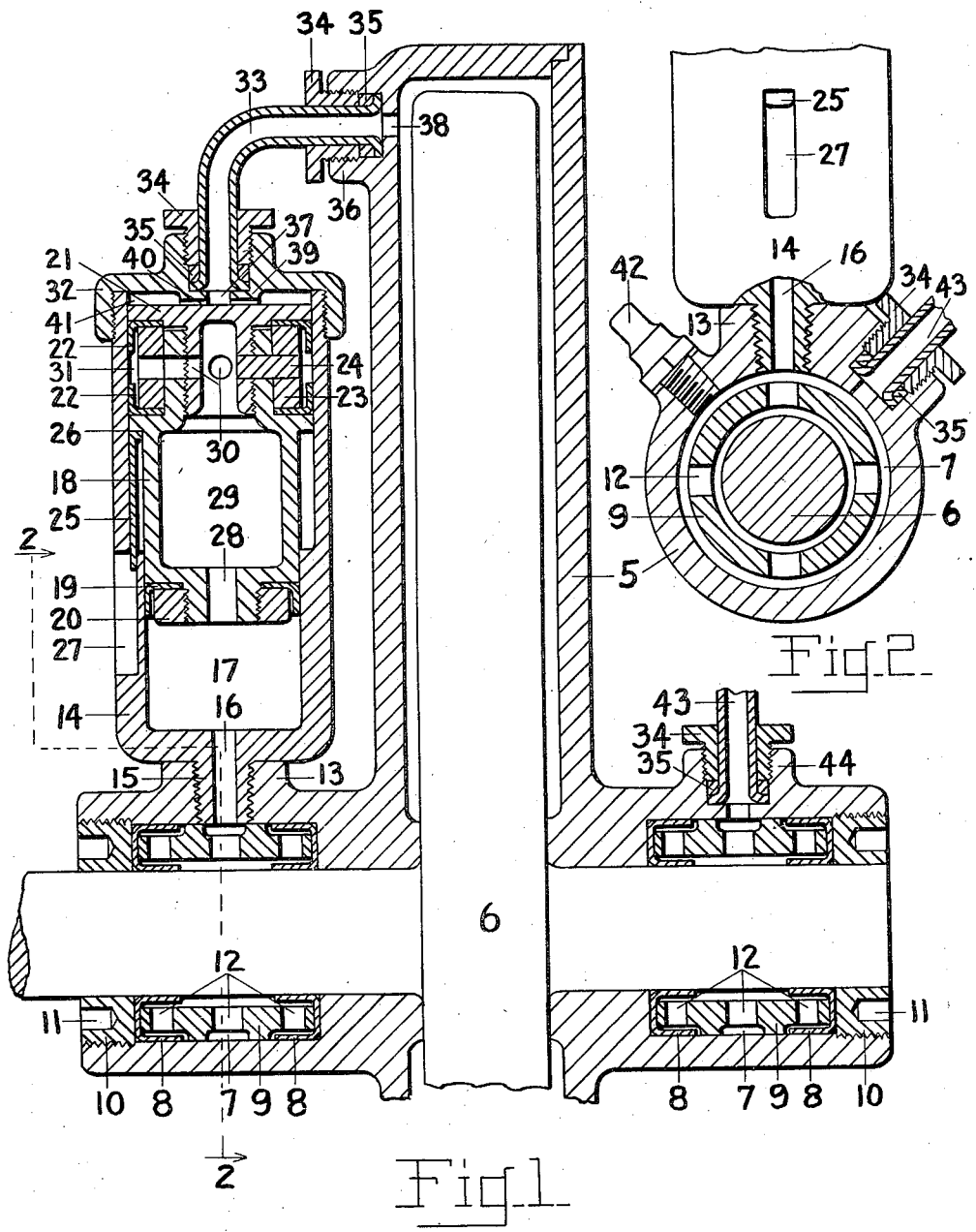
INVENTOR
Bryan P. Joyce INVENTOR
Bryan P. Joyce Patented July 23, 1929.

1,721,737

UNITED STATES PATENT OFFICE.

BRYAN P. JOYCE, OF DAVENPORT, IOWA.

PRESSURE-FLUID PACKING.

Application filed July 29, 1927. Serial No. 209,269.

My invention has reference, in general, to packings and more particularly it relates to pressure fluid packings embodying a fluid seal, the sealing fluid usually being grease or other lubricant.

The principal object of my invention is to provide means whereby the pressure of the fluid packed may be utilized to regulate the pressure of the lubricant within the seal. Among the further objects of my invention are: to provide pressure in the lubricant seal of the packing, varying with the pressure of the fluid packed, and of just sufficient magnitude for sealing pressure, with the result that the packing will have a minimum of friction and wear with consequent saving in power; to provide means for indicating the amount of sealing lubricant; to provide a differential pressure means which may be incorporated in a piston or stuffing box or which may be built into a separate device, thereby making for compactness with consequent saving in weight and material; to provide a device which utilizes the lubricant of the packing seal for its lubrication, therefore requiring no service for itself; and such further objects, advantages and capabilities as will hereafter appear and as are inherent in the construction disclosed herein. My invention further resides in the combination, construction and arrangement of parts illustrated in the accompanying drawings, and, while I have disclosed therein what is now considered the preferred form of this invention and a modification thereof, I desire it understood that the present disclosure is to be considered as illustrative only and not as limiting my invention.

Figure 3:
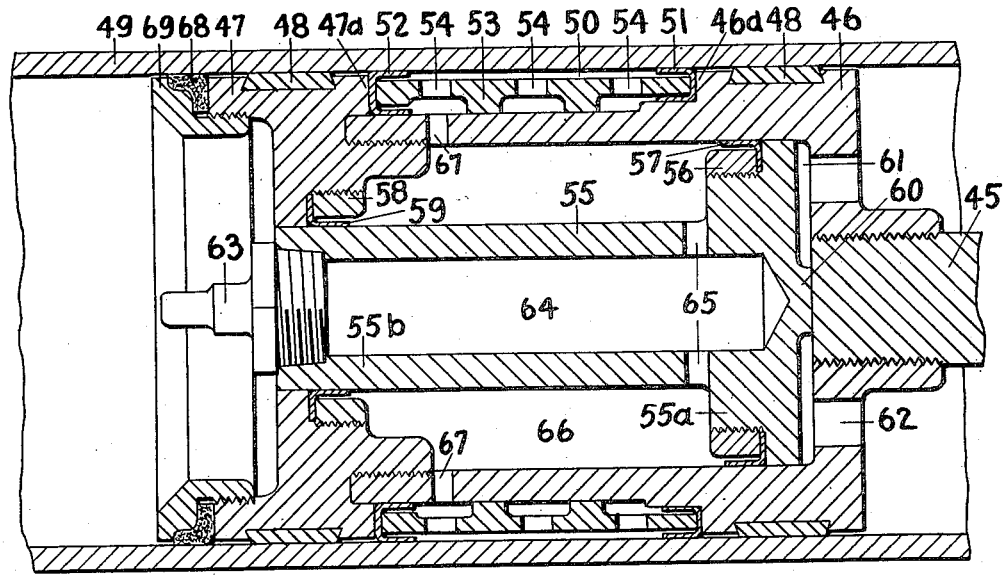
Figure 4:
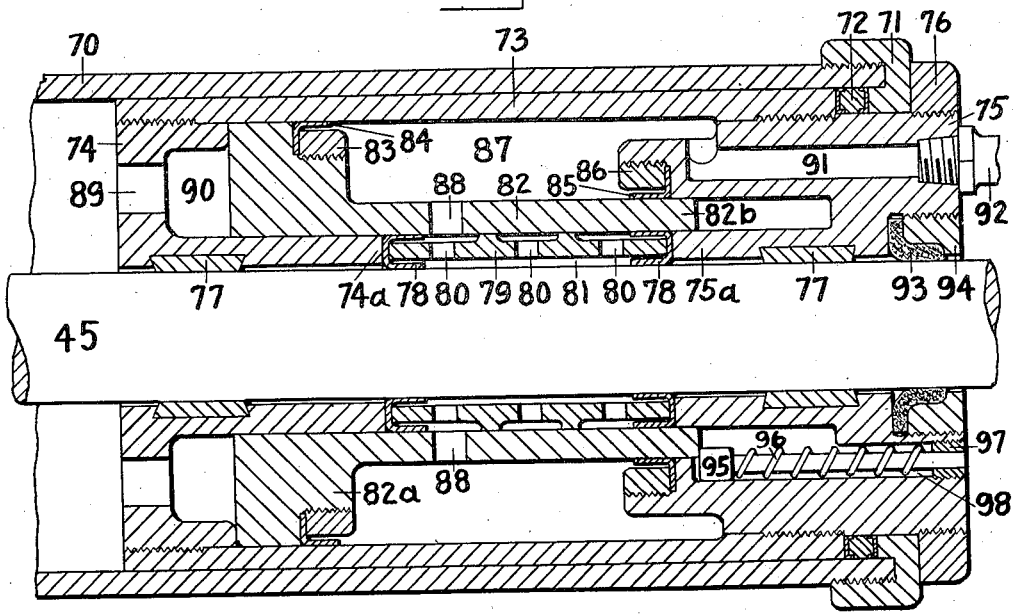

In the drawings annexed hereto and forming a part hereof, Fig. 1 is a longitudinal section showing my invention as applied to a centrifugal pump, the mechanism of the invention being shown on a larger scale than the pump; Fig. 2 is a partial view and section from the left of Fig. 1, substantially along the plane indicated by the broken line 2—2; Fig. 3 is a longitudinal section showing my invention applied to a piston; Fig. 4 is a longitudinal section showing my invention applied to a stuffing box.

Referring more in detail to the annexed drawings, 5 is the housing of a centrifugal pump in which the rotor 6 is mounted. A cylindrical chamber 7 for sealing lubricant surrounds the rotor shaft and is inclosed at its edges by the packing rings 8 spaced apart by the ring 9, said ring 9 being constructed with holes 12 to permit flow of sealing lubricant to all parts of the chamber 7. The packing rings 8 may be of any suitable type although the metal rings having a sealing friction surface consisting largely of soft metal, or having a sealing friction surface of polished metal, covered by my Patent No. 1,583,931 dated May 11, 1926, and my application Serial No. 230,894 filed Nov. 3, 1927, and shown in certain of my copending applications, are preferred, one of them being indicated generally in the present drawing. The ring 10 screwed into the housing 5 by means of the spanner holes 11 holds the packing in place. The case 14 is formed with a projection 15 which is threaded into the boss 13 of the housing 5, this case containing a chamber 17 provided with an outlet 16 into the chamber 7. The floating piston 18 is slidably mounted within the case 14. The piston 18 is packed at its lower end by the packing ring 19 held by the threaded ring 20. The upper end of the piston 18 is packed by the packing rings 22 spaced by the ring 23 and held in place by the threaded piston head 21, the whole being locked in position by the driven pin 24. An indicator 25 is secured to the piston 18, as at 26, by brazing and registers in the slot 27 the position of the piston 18.

Holes and passages 28, 29 and 30 afford access through the piston 18 to the chamber 31. The cap 32 is threaded on the upper end of the case 14 and receives one end of the pipe 33 with its packing 35 and gland 34, the other end of the pipe being secured in like manner in the boss 36 of the housing 5. The ends of the pipe 33 are aligned with the holes 37 and 38. The boss 39 on the underside of the cap 32 stops the upward movement of the piston 18 and provides a chamber 41 at the upper end of the case 14, the slot 40 in the boss 39 preventing the piston from closing the hole 37. While the boss 36 is shown at the outer circumference of the housing 5 it is understood that the pipe 33 may communicate with the interior of the housing at any point desired. It is also to be understood that the case 14 and its parts are shown enlarged with respect to the pump parts for the sake of clearness. The chambers 7, 17 and the passages within the piston 18 and the chamber 31 may be filled with lubricant by means of the valve 42 (Fig. 2). The chamber 7 of the right hand packing (Fig. 1) is also filled at the same time by means of the pipe 43, which places the chamber 7 of both packings in communication, as one end is secured to the boss 13 and its other end in the boss 44 by means of the glands 34 and packings 35. The pressure fluid supplied to the chamber 41 from the housing 5 acts on the upper end of the piston 18, the lower end of the piston 18 acting upon the lubricant in the chamber 17. As the lower end of the piston is smaller than its upper end, the lubricant is under greater pressure per unit of area than the fluid within the housing 5, thereby insuring a perfect seal at the packings. By properly choosing the areas of the upper and lower ends of the piston any desired relative sealing pressure is obtained. The percent the lubricant pressure should exceed the fluid pressure is dependent upon the consistency of the fluid. In by Patent No. 1,607,350, dated November 16, 1926, it may be seen that a spring was used to boost the seal pressure above the fluid pressure, in this packing the spring strength had to be based on the maximum expected fluid pressure with the result that when the machine operated below such maximum pressure the seal pressure was greater than necessary, meaning greater packing friction and wear than was necessary. In my present invention, as the seal pressure is dependent upon the fluid pressure, the packing friction and wear is at the necessary minimum at all times, no matter at what pressure the machine is operating.

In Fig. 3 the piston rod 45 is threaded to the piston body 46 to which the head 47 is threaded, the body and head carrying bands of anti-friction metal 48 to center the piston in the cylinder 49. Between shoulders 46$^a$ and 47$^a$ on body and head are the packing rings 51 and 52 spaced by the ring 53 to form a cylindrical chamber 50. The holes 54 in the ring 53 permit flow of sealing lubricant to all parts of the chamber 50. Mounted within the body 46, is a floating piston 55 having a head 55$^a$ carrying a packing ring 57 secured in place by the threaded ring 56. The floating piston stem 55$^b$ is packed by the ring 59 secured to the head 47 by the threaded ring 58. The piston 55 carries a boss 60 to stop its inward movement and to form a chamber 61 within the body 46. Pressure fluid is admitted to the chamber 61 by the holes 62 in the body 46 while the valve 63 admits sealing lubricant to fill the chambers and passages 64, 65, 66, 67 and 50. Pressure fluid within the chamber 61 acts upon the head of the floating piston 55 which transmits the pressure to the lubricant in the chamber 66. The lubricant pressure exceeds the fluid pressure proportionately to the areas of the floating piston head and the annulus of the chamber 66. In a fast moving piston, such as one attached to a gun, the inertia of the floating piston 55 will increase the lubricant pressure at the beginning of recoil until such inertia is overcome.

The ring 69 threaded to the head 47 carries a suitable wiper 68. It may be seen by referring to the piston packing of my Patent No. 1,607,350 dated November 16, 1926, that the present invention permits of more compact construction with consequent saving in weight and material. In this construction, the position of the stem of the floating piston 55 indicates the quantity of lubricant within the chamber 66. In some machines it is important that such indicating means be provided, for example in recuperators of gun carriages, for, when the gun is fired rapidly, a considerable increase in the temperture of the recuperator parts takes place; as the coefficient of expansion of the lubricant is greater than that of the inclosing metal parts, care must be taken not to completely fill the sealing lubricant space, for the increase in temperature will cause a dangerous lubricant pressure. In some machines it is also necessary to use two packing rings at each end of the chamber 50 in order to prevent excessive escape of the sealing lubricant.

In Fig. 4, the cylinder 70 is threaded to receive the ring 71 which seats a packing ring 72, such, for example, as is shown in my Patents Nos. 1,635,482 and 1,651,131, dated respectively, July 12, 1927 and November 29, 1927. The stuffing box housing, consisting of the body 73 having ends 74 and 75 threaded therein is held against the packing 72 by means of the threaded ring 76, this construction being covered in one of my copending applications. The piston rod 45 is centered by the anti-friction metal bands 77 carried by the ends 74 and 75. Packing rings 78 are seated as at 74$^a$ and 75$^a$, and are spaced by the ring 79 having holes 80 to permit flow of sealing lubricant to all parts of the chamber 81. The annular floating piston 82 is mounted within the stuffing box, forming a chamber 87, and the head 82$^a$ of the piston is packed by the packing ring 84, held in place by the threaded ring 83. The stem 82$^b$ of the piston is packed by the packing ring 85 held to the end 75 by the threaded ring 86, the inner circumference of the piston 82 being packed by the rings 78. The holes 88 place the chamber 87 in communication with the chamber 81 and these lubricant chambers are filled through the valve 92 and the passage 91 in the end 75. A suitable wiper 93 is carried by the ring 94 threaded to the end 75. Pressure fluid enters the chamber 90 through the holes 89 in the end 74 and acts upon the piston head 82$^a$. The piston 82 is limited in its inward movement by the end 74 and in its outward movement by the end 75. The position of the piston 82 is shown by the indicator 95, held in contact with the piston stem 82$^b$ by the helical spring 96 seated against the bushing 97 threaded into the end 75, the indicator being mounted in the cylindrical hole 98 in the end 75. The pressure of the lubricant in the seal exceeds the pressure of the pressure fluid, proportionately to the areas of the piston head 82ª as in chamber 90 and the area of the annulus of the chamber 87. In some machines it is necessary to employ two rings at each end of the chamber 81. The remarks made above as to the importance of the indicating means in some machines also apply to this stuffing box packing. In my Patent No. 1,607,350, dated November 16, 1926, the packing seal is variable in length but in my present invention the packing seal is of a constant length and permits such length to be fixed to give the most effective results. A variable length of seal also requires a movable packing ring but packing rings are most effective when they may be fixed in place as in the present invention.

While I have shown and described certain specific embodiments of my invention, it is of course understood that the specific description of structure set forth above may be departed from without departing from the spirit of my invention as set forth in this specification and the appended claims.

Having now described my invention, I claim:

1. In a self-contained pressure fluid machine, the combination of a packing and a fluid-pressure intensifier, said packing comprising a sealing chamber between relatively movable parts of the machine, closed by metal packing rings and full of fluid, said fluid being adapted to maintain the packing rings in sealing contact, said intensifier being integral with a major part of the machine, in open communication with the machine fluid and adapted to maintain the sealing fluid within the packing chamber under a greater unit pressure than the pressure of the fluid within the machine adjacent the packing, and to so regulate the pressure of said sealing fluid as to keep the friction and wear of the packing at a minimum, and means to indicate the amount of sealing fluid.

2. In a self-contained pressure fluid machine, the combination of a packing and a fluid-pressure intensifier, said packing comprising a sealing chamber between relatively movable parts of the machine, closed by metal packing rings and full of fluid, said fluid being adapted to maintain the packing rings in sealing contact, said intensifier being integral with a major part of the machine, in open communication with the machine fluid and adapted to maintain the sealing fluid within the packing chamber under a greater unit pressure than the pressure of the fluid within the machine adjacent the packing, and to so regulate the pressure of said sealing fluid as to keep the friction and wear of the packing at a minimum, means to indicate the amount of sealing fluid and valve means to permit replenishment of the sealing fluid.

3. In a pressure fluid machine, a packing between relatively movable parts thereof, said packing comprising a chamber full of fluid closed at its ends by metal packing rings, said fluid being adapted to maintain the packing rings in sealing contact, a fluid pressure intensifier in open communication with the packing fluid and the machine fluid, to maintain the packing fluid under proportionately greater pressure than the machine fluid adjacent the packing and valve means to permit replenishment of the packing fluid.

4. In a pressure fluid machine, a packing between relatively movable parts thereof, said packing comprising a chamber full of fluid closed at its ends by packing rings, means within the movable machine part adapted to form a chamber within the part adjacent the packing, said chamber being full of packing fluid and in open communication with the packing chamber and said means being adapted to maintain the packing fluid under greater pressure than the machine fluid.

5. In a pressure fluid machine, a packing between relatively movable parts thereof, said packing comprising a chamber full of fluid closed at its ends by metal packing rings, means within one of the machine parts adapted to form a chamber within the part and adjacent the packing, said chamber being full of packing fluid and in open communication with the packing chamber at all times, said means being adapted and being the sole means to maintain the packing fluid under greater pressure than the machine fluid adjacent the packing, means to indicate the amount of packing fluid and valve means to permit replenishment of the packing fluid.

6. In a pressure fluid machine, a packing between relatively movable parts thereof, said packing comprising a chamber of annular section, full of fluid and closed at its ends by packing rings, a circular chamber within one of the machine parts circumferentially adjacent the packing chamber and in open communication therewith, and the machine chamber containing packing fluid and means adapted to maintain the packing fluid under greater pressure than the machine fluid.

In witness whereof, I hereunto subscribe my name to this specification.

BRYAN P. JOYCE.